| (12) | United States Patent | (10) Patent No.: | US 9,732,726 B2 |
|---|---|---|---|
| | Botwright | (45) Date of Patent: | Aug. 15, 2017 |

(54) COMPONENT HANDLING, IN PARTICULAR WIND TURBINE COMPONENT HANDLING

(71) Applicant: Vestas Wind Systems A/S, Aarhus N. (DK)

(72) Inventor: Adrian Botwright, Sabro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/108,931

(22) PCT Filed: Dec. 18, 2014

(86) PCT No.: PCT/DK2014/050443
§ 371 (c)(1),
(2) Date: Jun. 29, 2016

(87) PCT Pub. No.: WO2015/101375
PCT Pub. Date: Jul. 9, 2015

(65) Prior Publication Data
US 2016/0327018 A1    Nov. 10, 2016

(30) Foreign Application Priority Data

Dec. 30, 2013 (DK) .................................. 2013 70824

(51) Int. Cl.
*B60P 7/00* (2006.01)
*F03D 1/00* (2006.01)
(Continued)

(52) U.S. Cl.
CPC ................ *F03D 1/005* (2013.01); *B60P 3/40* (2013.01); *F03D 13/10* (2016.05); *F03D 13/40* (2016.05); *Y02E 10/726* (2013.01); *Y02E 10/728* (2013.01)

(58) Field of Classification Search
CPC . F03D 13/40; F03D 13/10; B60P 3/40; Y02E 10/726; Y02E 10/728
(Continued)

(56) References Cited

U.S. PATENT DOCUMENTS 4,209,276 A   6/1980   Rosen
8,602,700 B2 *  12/2013   Johnson ................... F03D 13/40
                                                                410/44
(Continued)

FOREIGN PATENT DOCUMENTS

DE   202012009278 U1   11/2012
EP       2360372 A1    8/2011
(Continued)

OTHER PUBLICATIONS

International Searching Authority, Search Report and Written Opinion Issued in Corresponding International Application No. PCT/DK2014/050443, dated Mar. 19, 2015.
(Continued)

*Primary Examiner* — Stephen Gordon
(74) *Attorney, Agent, or Firm* — Wood Herron & Evans LLP

(57) ABSTRACT

A method for storing and/or transporting a plurality of objects (5a, 5b) for one or more wind turbines is presented, the method comprising—arranging a first object (5a) to be supported by a plurality of wheels (901),—arranging a second object (5a) to be supported by a plurality of wheels (901),—rolling the first object into a first location (13a),—subsequently raising the first object to a second location (13b) above the first location, and—subsequently rolling the second object into the first location, thereby inserting the second object under the first object.

20 Claims, 12 Drawing Sheets

(51) Int. Cl.
*F03D 13/40* (2016.01)
*B60P 3/40* (2006.01)
*F03D 13/10* (2016.01)

(58) Field of Classification Search
USPC ........................................ 410/32, 33, 44, 45
See application file for complete search history.

(56) References Cited

U.S. PATENT DOCUMENTS

2007/0177954 A1* 8/2007 Kootstra ................. B60P 3/40
                                                        410/44
2008/0232920 A1   9/2008 Wobben
2009/0188204 A1   7/2009 Stubler et al.
2013/0008097 A1   1/2013 Margevicius et al.

FOREIGN PATENT DOCUMENTS

| EP | 2620389 A1 | 7/2013 |
| JP | 2006224857 A | 8/2006 |
| WO | 2007093854 A2 | 8/2007 |
| WO | 2010012280 A1 | 2/2010 |
| WO | 2010060833 A2 | 6/2010 |
| WO | 2011076238 A1 | 6/2011 |

OTHER PUBLICATIONS

Danish Patent and Trademark Office, Search Report Issued in Application No. PA 2013 70824, dated Aug. 15, 2014.

* cited by examiner

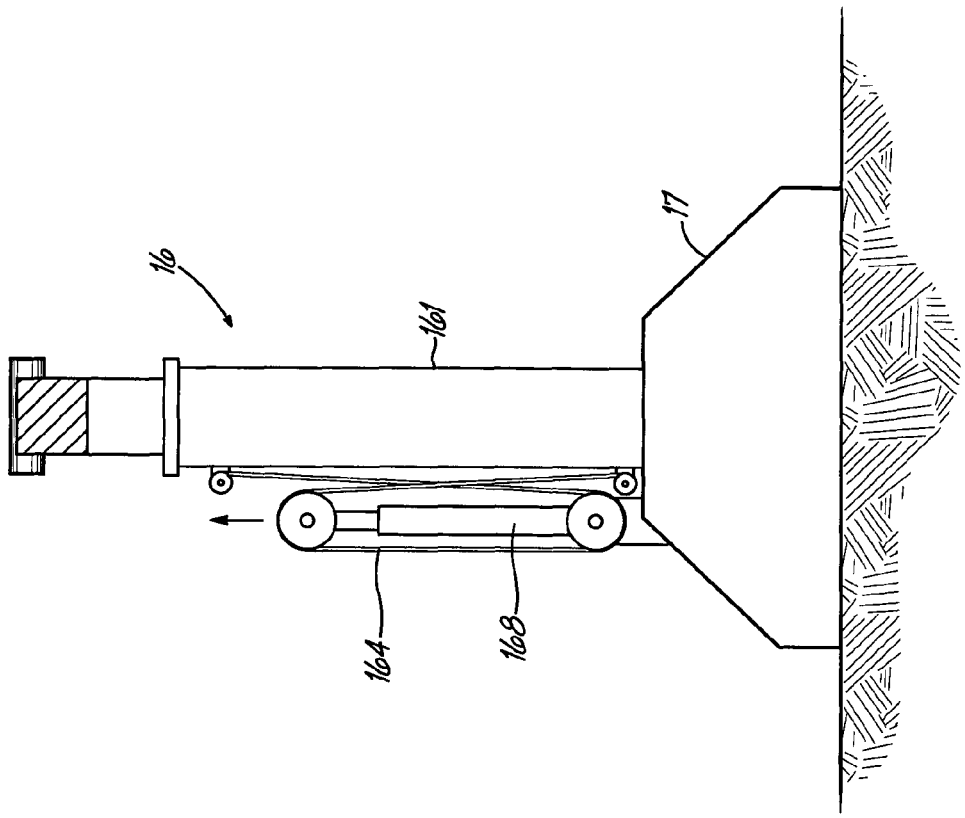
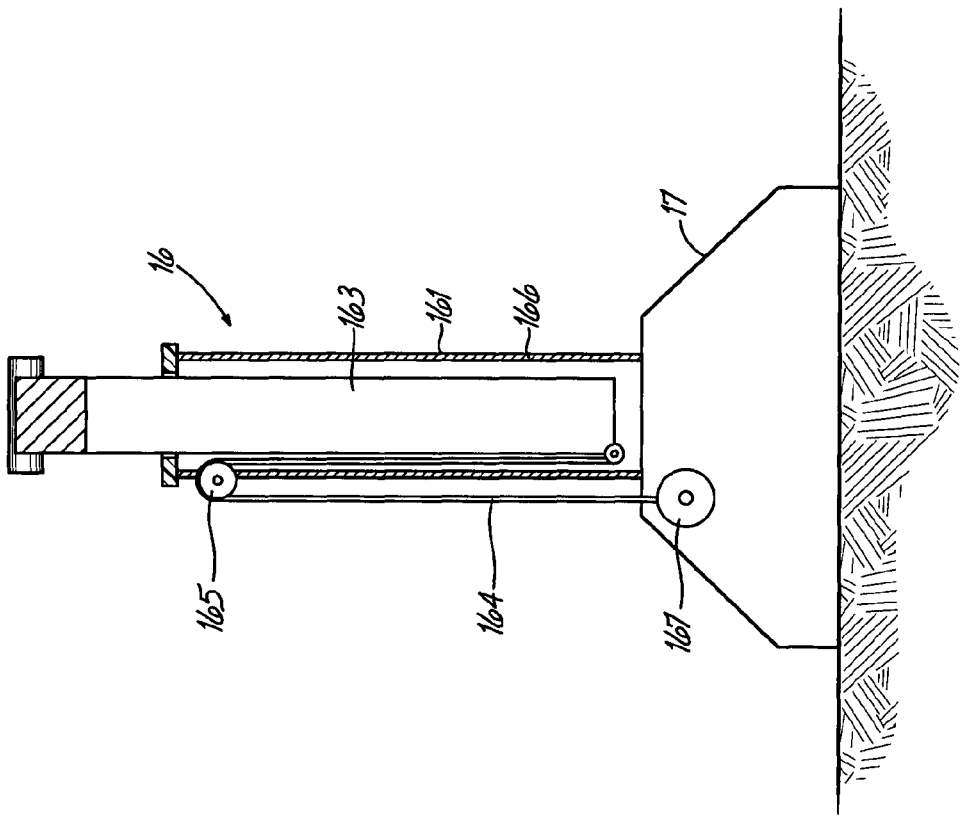

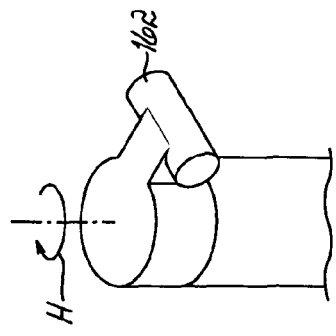
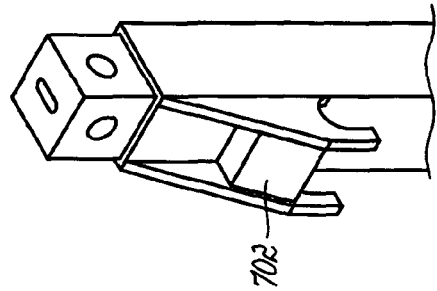
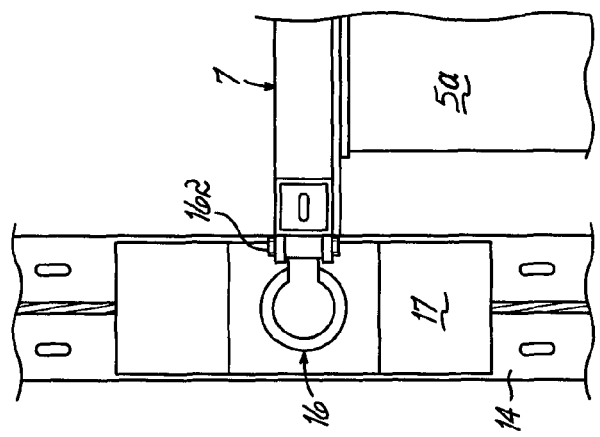
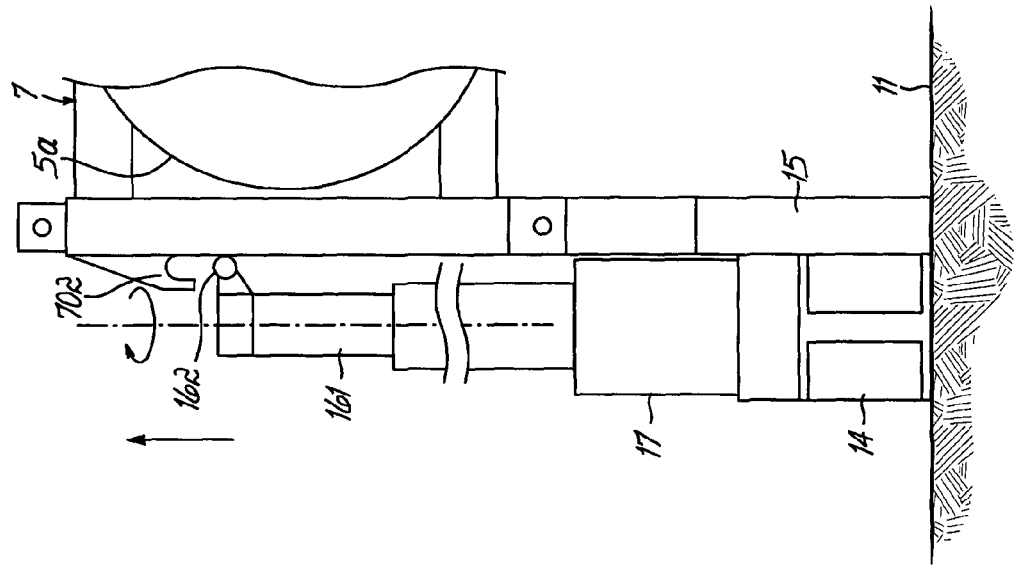

COMPONENT HANDLING, IN PARTICULAR WIND TURBINE COMPONENT HANDLING

TECHNICAL FIELD

The invention relates to methods for storing and/or transporting a plurality of objects for one or more wind turbines, and a method for storing and/or transporting a plurality of objects.

BACKGROUND OF THE INVENTION

There is a trend of new wind turbine models having increased rated power, and this increases the sizes of the turbines. The total weight of some modern offshore wind turbines amount to hundreds of tons, and in some cases the total weight of the blades only exceed a hundred tons.

Normally, before wind turbines are installed, their components, such as towers, blades and nacelles, are manufacturing at separate factories, after which the components are transported to the wind turbine erection sites. In addition some components, like towers, can be transported separated into sub-components, for example tower sections, from factories to assembly sites, at which the sub-components are assembled into components which are sent to the installation sites. Wind turbine tower sections are usually assembled by bolting flanges at the tower section ends together.

Transportation of wind turbine components usually takes place on roads, on railroad or at sea. The increasing sizes of wind turbine models mean that the sizes of their components increase as well. This causes challenges to their transportation.

For transport of wing turbine tower sections, a transport frame can be bolted onto the flange at each tower section end; DE202012009278U1 shows an example of such a frame. WO2007093854A2 discloses an example of an alternative device to be mounted to tower section flanges for tower transport. Similarly, for blades a transport frame can be bolted onto a flange at the blade root end, and another frame can be mounted somewhere between the tip of the blade and the blade centre of gravity.

Stacking components on top of each other can be useful to save floor space on the transporting vehicle or vessel, and to increase carrying capacity. For example, towers sections for a plurality of towers, or blades for a plurality of wind turbines, can be stowed on the deck of a sea vessel, or onto a train. Thereby, frames of the type mentioned above can be used for stacking the tower sections or the blades on top of each other. Examples of such stacking for tower sections are shown in EP2360372A1, US2008232920A1, WO2007093854A2 and WO2010012280A1, and for blades in WO2011076238A1.

Moving wind turbine components onto or off from a vessel or a vehicle is usually done with a crane. Also stacking of wind turbine components is usually done with a crane. Due to the increasing sizes of the components, large capacity cranes are needed at the site at which handling takes place. This adds to the complexity and planning of the transport handling procedures. In particular, the large cranes with the capacity needed for some wind turbine components might cause ground capacity problems, for example at harbour quays for loading components onto a sea vessel.

A way to avoid cranes when loading components onto or off from a vessel (e.g. a sea vessel) or a vehicle (e.g. a road truck or a railway vehicle) is to use a roll-on-roll-off system, i.e. a system where support devices with wheels are secured to the transported components, and the components with the support devices are rolled onto or off from vessel or vehicle. For example, a sea vessel can be provided in the form of a roll-on-roll-off ship (RoRo ship), which has a loading area which is accessible from a quay and allows the cargo to be rolled on and off the ship.

A problem with roll-on-roll-off systems is that they do not allow for stacking components without the use of a crane. However, as stated cranes can entail added complexity and planning of the transport handling procedures.

The discussion above focuses on transportation of wind turbine components, but similar considerations and problems can appear for storing wind turbine components.

SUMMARY

It is an object of the invention to improve wind turbine component handling. It is another object of the invention to reduce crane lifting operations in wind turbine component handling. It is a further object of the invention to increase the carrying capacity of wind turbine component transport vehicles and vessels. It is yet another object of the invention to facilitate transportation of large wind turbine components.

These objects are solved by a method for storing and/or transporting a plurality of objects for one or more wind turbines, the method comprising
  arranging a first object to be supported by a plurality of wheels, and
  arranging a second object to be supported by a plurality of wheels, the method further comprising
  rolling the first object into a first location,
  subsequently raising the first object to a second location above the first location, and
  subsequently rolling the second object into the first location, thereby inserting the second object under the first object.

By rolling the first wind turbine object into the first position and then subsequently raising the first object to the second location above the first location, enough to insert the second wind turbine object under the first object, the raising of the first object can be a short, local and relatively limited vertical movement. Therefore, the first object can be raised with an arrangement provided adjacent to, or in the direct vicinity of the first location. Thus, this arrangement can be simple and specialised for this particular raising step, and the stacking of the first and second objects can be done without a crane. Thereby, stacking of transported wind turbine components is allowed, while not adding to the complexity of the transport handling procedures. Thereby, transportation of large wind turbine components is facilitated, and wind turbine component handling is improved.

A particular advantage of the invention is that it allows for the objects to be rolled onto the vessel or vehicle individually, and then stacked on top of each other once on the vessel or vehicle, without the use of a crane. It should be noted however that the invention can also be used for stacking the objects As exemplified below with reference to the figures, it is understood that for undoing the stacking of the first and second objects, essentially the steps mentioned above are carried out in a reverse order, i.e. the second object is rolled away from the first location, the first object is lowered to the first location, and the first object is rolled away from the first location.

The steps of arranging the first and second objects to be supported by a plurality of wheels can be performed in a number of alternative ways. The first and second objects can be placed onto multi-axle trailers or self-propelled modular trailers (SPMTs), or one or more handling interface devices, (examples of which are discussed below), with wheels can be mounted onto the first and second objects.

Preferably, after rolling the second object into the first location, the first object is lowered so as to be supported by the second object or one or more handling interface device, such as frames, (examples of which are discussed below), mounted to the second object. Preferably, the first location is on a vehicle or a vessel and the first and second objects are rolled onto the vehicle or the vessel before being rolled into the first location.

Preferably, the method comprises mounting to each of the first and second objects at least one handling interface device, as exemplified below with reference to the figures. For example, for each object there could be one handling interface device in the form of a cradle, or there could be two handling interface devices each in the form of a frame.

Preferably, the at least one handling interface device mounted onto the first object presents a plurality of engagement elements, the method further comprising engaging a raising arrangement to the engagement elements, the step of raising the first object to the second location being carried out by means of the raising arrangement.

Preferably, when the at least one handling interface is mounted on the first object, the engagement elements are arranged distributed around the centre of gravity of the first object.

The engagement of the raising arrangement with the engagement elements is preferably done after the first object has been rolled into the first location.

As exemplified below, the raising arrangement can comprise jack up devices, herein also referred to as jacks, arranged to push up the first object. Each jack up device is a mechanical device that can apply a linear force, and it comprises an actuation device such as a hydraulic cylinder or a screw thread. To "push" means here to use force to move something away from the actuation device directly causing the motion.

Preferably, after rolling the second object into the first location, the first object is lowered so as to be supported by one or more handling interface devices mounted to the second object, and the handling interface devices are used to fix the first and second objects to each other after the step of lowering the first object onto the second object.

Preferably, where the first and second objects are elongated objects, the method comprises mounting to each of the first and second objects at least two handling interface devices, each handling interface device mounted to the first object comprising at least one engagement element, preferably two engagement elements, the method further comprising engaging to each of the engagement elements a respective jack up device, the step of raising the first object to the second location being carried out by means of the jack up devices.

Preferably, on each of the first and second objects, the two handling interface devices are mounted at opposite sides of centre of gravity, at two respective locations being separated in the longitudinal direction of the respective object.

Preferably, each of the jack up devices presents an engagement device for engaging a respective of the engagement elements, at least one of the engagement devices being adapted to be rotated around a vertical axis. Thereby, as exemplified below with reference to the figures, where the jack up device is installed such that it cannot be rotated, the jack up device can still be used for raising objects on both sides of the jack up device, simply by swinging the engagement device to face either side of the jack up device.

The method can further comprise
arranging a third object to be supported by a plurality of wheels, for example by placing it onto an SPMT or mounting one or more handling interface devices with wheels thereon,
fixing the first and second objects to each other after lowering the first object onto the second object,
subsequently raising the first and second objects to the second location above the first location,
subsequently rolling the third object into the first location, thereby inserting the third object under the second object, and
subsequently lowering the first and second objects onto the third object.

Thereby, the invention can advantageously be used for blades. Since most modern wind turbines have three blades, this can provide for arranging stacks with sets of three blades for a wind turbine.

Similarly to what has been mentioned above regarding the first and second objects, where the first location is on a vehicle or a vessel, the third object can be rolled onto the vehicle or the vessel before being rolled into the first location. Also, the third objects can, like the first and second objects, be elongated objects, and the method can comprise mounting to the first, second and third objects at least two handling interface devices, each handling interface device mounted to the second object comprising at least one engagement element, preferably two engagement elements, the method further comprising engaging to each of the engagement elements of the handling interface devices mounted to the second object, a respective jack up device, the step of raising the first and second objects to the second location being carried out by means of the jack up devices. Thereby, the handling interface devices on the second and third objects can be used to fix the second and third objects to each other after the step of lowering the first a second objects onto the third object.

A further aspect of the invention is defined in claim 16, related to a method for storing and/or transporting a plurality of objects. Thereby, the method can be used for storing and/or transporting objects other than objects for wind turbines.

DESCRIPTION OF FIGURES

Below embodiments of the invention will be described with reference to the drawings, in which FIG. 10a-FIG. 10d show views of details for raising the raising the tower section in FIG. 3.

DETAILED DESCRIPTION

Figure 1:
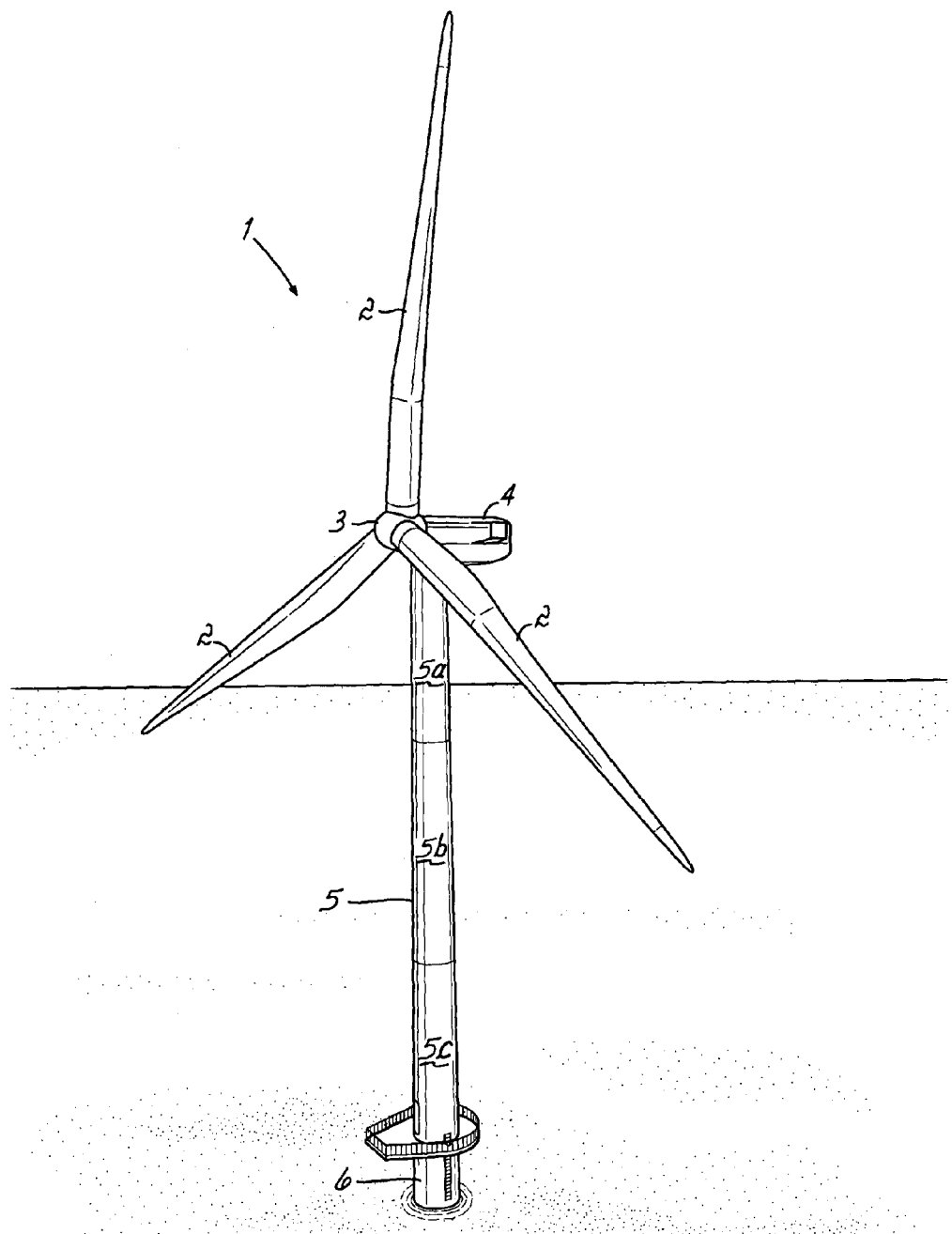
FIG. 1 shows an offshore wind turbine.

FIG. 1 shows an offshore wind turbine 1 with three blades 2. It should be mentioned that the invention is equally applicable to onshore wind turbines. The blades 2 are mounted to a hub 3, forming together with the blades 2 a rotor. The hub 3 is in turn connected to a generator housed in a nacelle 4. The nacelle 4 is mounted on top of a tower 5, which in turn is mounted on an offshore foundation 6. The nacelle 4 can be rotated around a vertical axis for the rotor to be oriented into the wind as the latter changes direction. The tower 6 comprises three tower sections 5a, 5b, 5c, which are mounted to each other at adjacent ends of the tower sections. The tower sections have internal flanges at their ends and they are connected to each other by bolts through adjacent flanges.

Figure 2:
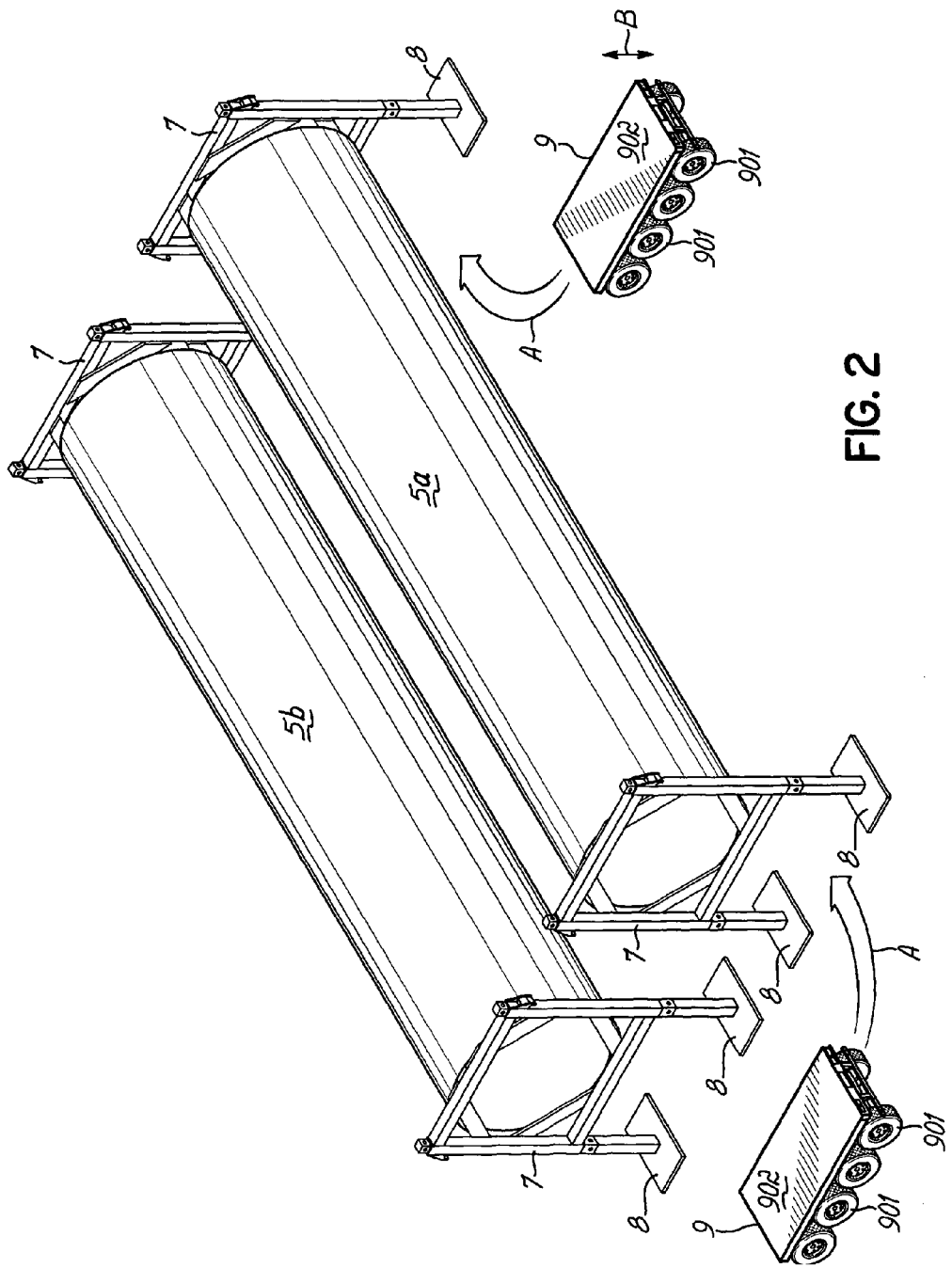
FIG. 2 is a perspective view of two tower sections with frames, and self-propelled modular trailers.

FIG. 2 depicts two elongated objects in the form of a first tower section 5a and a second tower section 5b, both stored on land in a harbour area. The tower sections 5a, 5b, made of steel, are intended for a wind turbine tower, and will be transferred to a sea vessel for transport to a tower assembly site. At each end of the first and second tower sections 5a, 5b, a handling interface device 7 is mounted. Each handling interface device 7 is provided in the form of a steel frame 7 which is bolted onto respective internal flanges of the tower sections 5a, 5b. The tower sections 5a, 5b are supported by storage legs 8 detachably mounted to the handling interface device 7.

As can be seen in FIG. 2, in a first step of an embodiment of the method according to the invention, the first tower section 5a is arranged with a plurality of wheels 901. This is done by placing the first tower section 5a onto two so called self-propelled modular trailers 9 (SPMTs). More particularly, the SPMTs 9 are driven, as indicated by the arrows A, into respective positions under a respective of the frames 7, between the storage legs 8. Each SPMT 9 comprises a chassis with a plurality of wheels 901, and a load platform 902, which can be raised and lowered with a hydraulic arrangement, as indicated by the double arrow B. Under the frames 7, the load platforms 902 are raised so that the first tower section 5a is supported by the SPMTs 9.

Figure 3:
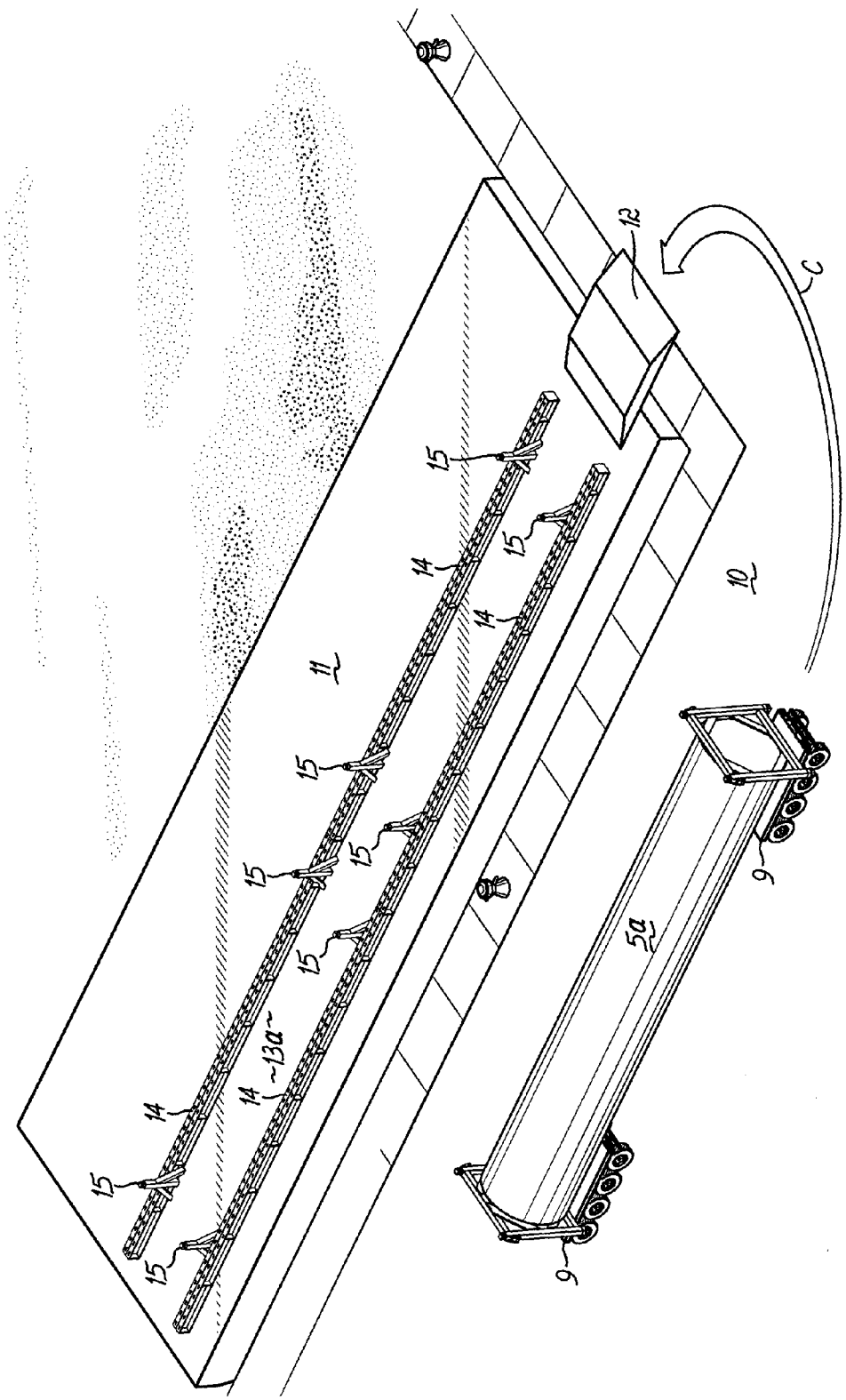
FIG. 3 is a perspective view of one of the tower sections in FIG. 2, and a sea vessel.

As can be seen in FIG. 3, by means of the SPMTs 9, the first tower section 5a is moved to a quay 10, at which a so called roll-on-roll-off vessel (RoRo vessel) 11 is docked. The RoRo vessel 11 is a barge, but it can of course be any type of RoRo vessel. A ramp 12 is arranged to bridge a distance between the quay 10 and the vessel 11. By means of the SPMTs 9, the first tower section 5a is rolled onto the vessel 11, and into a first location 13a on the vessel 11. The first location 13a is between two skid beams 14 and sea fastening legs 15 described closer below.

Figure 4:
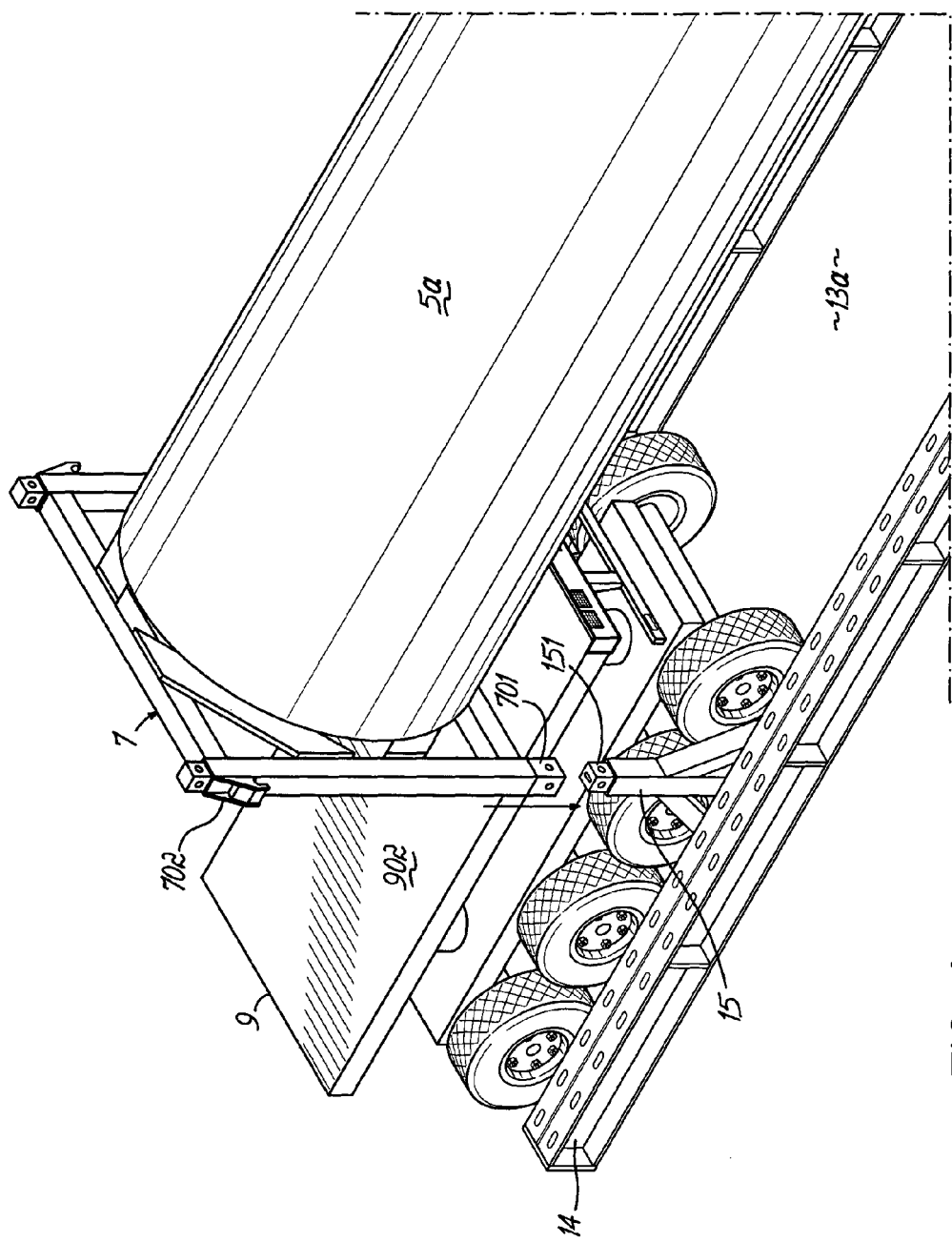
FIG. 4 is a perspective view of a part of the tower section in FIG. 3, on board the vessel in FIG. 3.

As can be seen in FIG. 4, in the first location 13a, the first tower section 5a is positioned so that lower corners 701 of the frames 7 are aligned with a respective sea fastening legs 15. Thus, there are four sea fastening legs arranged at the first location 13a, although in FIG. 4 only one sea fastening leg 15 is shown. Each sea fastening leg 15 is arranged to engage with a respective of the four lower corners 701 of the two frames 7 mounted on the tower section 5a. For this engagement, the load platforms 902 of the SPMTs 9 are lowered, so that upper ends 151 of the sea fastening legs 15 enter cavities of the respective lower corners 701 of the frames 7. The frames 7 can be secured to the sea fastening legs 15 by so called twistlock fittings.

Figure 5:
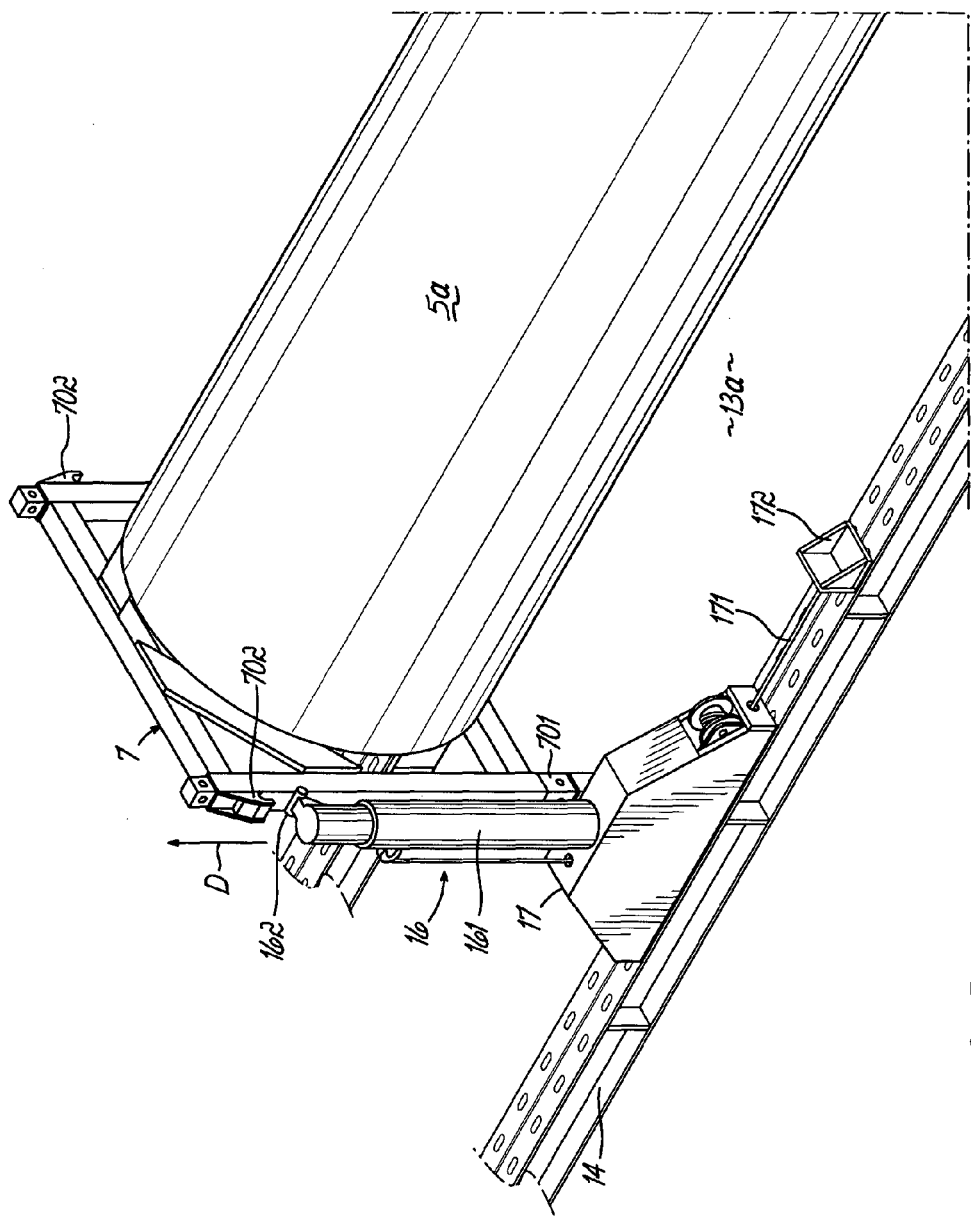
FIG. 5 is a perspective view of a part of the tower section in FIG. 3, on board the vessel in FIG. 3, and a jack for raising the tower section.

FIG. 5 shows how one of the skid beams 14 supports a jack 16, herein also referred to as a jack up device. Four such jacks 16, together forming a raising arrangement, are used to raise the first tower section from the first location 13a to a second location above the first location. Although for this presentation, the jack 16 is not shown in FIG. 4, it is understood that the jacks 16 can already be in their respective locations, for raising the first tower section 5a, when the first tower section is placed in the first location 13a.

The four jacks 16 are arranged so that two jacks are placed at each frame 7, on opposite sides of the respective frame 7. Each jack 16 is mounted on top of a skid shoe 17, which can be moved along the skid beam 14 by means of a wire 171 and an anchor 172, as described closer below. Each jack 16 comprises a telescopic leg 161, on top of which an engagement device in the form of a trunnion 162 is fixed. Each frame 7 presents two engagement elements 702 in the form of lugs 702 protruding on opposite sides of the first tower section 5a. The jacks 16 are aligned with a respective of the lugs 702. In a manner that is closer described below, the jacks 16 extend, as indicated by the arrow D, so that the trunnions 162 engage the lugs 702.

In alternative embodiments the skid shoes 17 can be moved along the skid beam 14 by means of a self-drive system. Also, suitable alternatives to the trunnions 162 can be provided.

Figure 6:
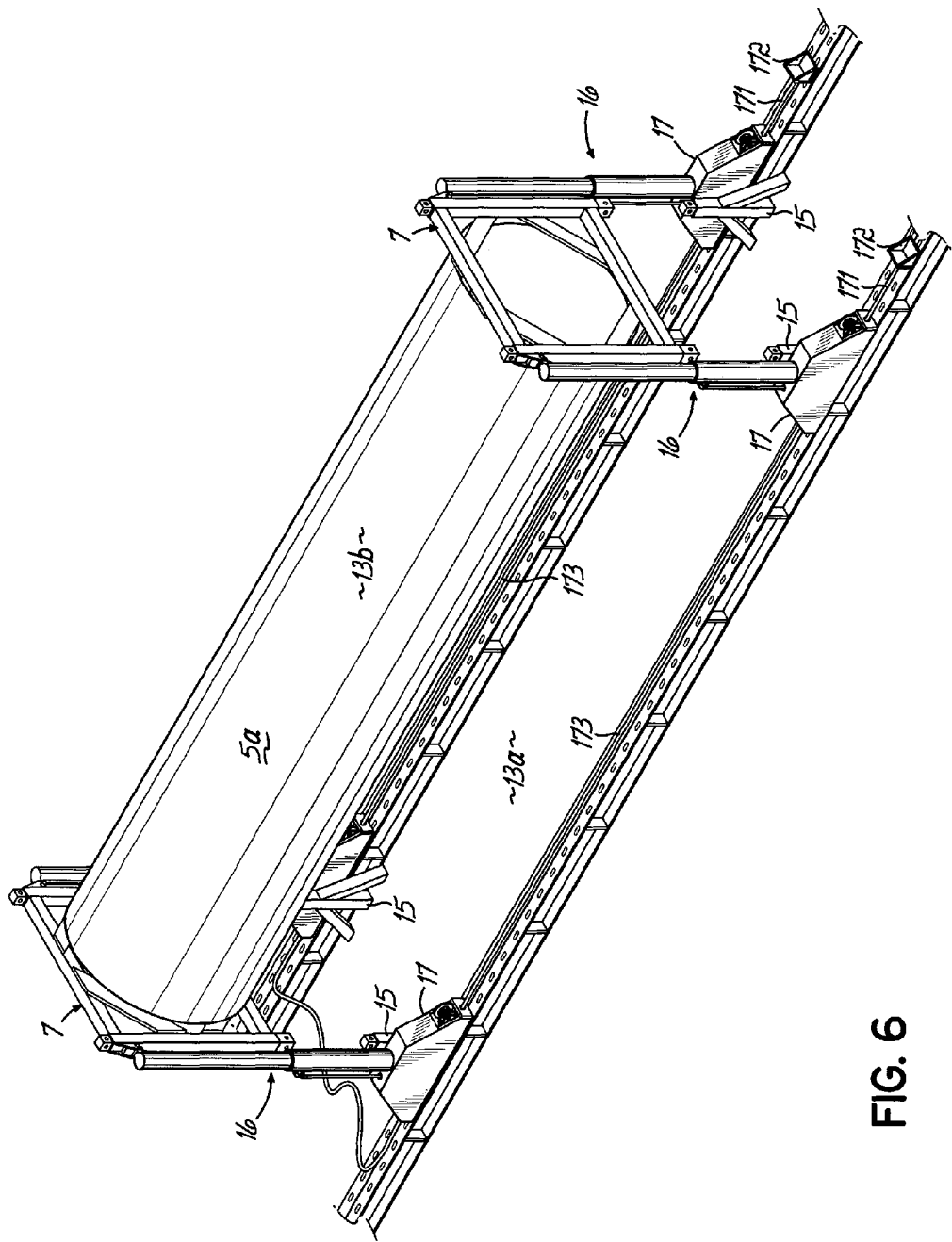
FIG. 6 is a perspective view of the tower section in FIG. 3 on board the vessel in FIG. 3, the tower being raised with jacks as the one shown in FIG. 5.

Referring to FIG. 6, by extending the jacks 16 further, the jacks push up the first tower section 5a, which is raised from the first location 13a to the second location 13b above the first location. Thereby, the frames 7 are lifted from the sea fastening legs 15.

Figure 7:
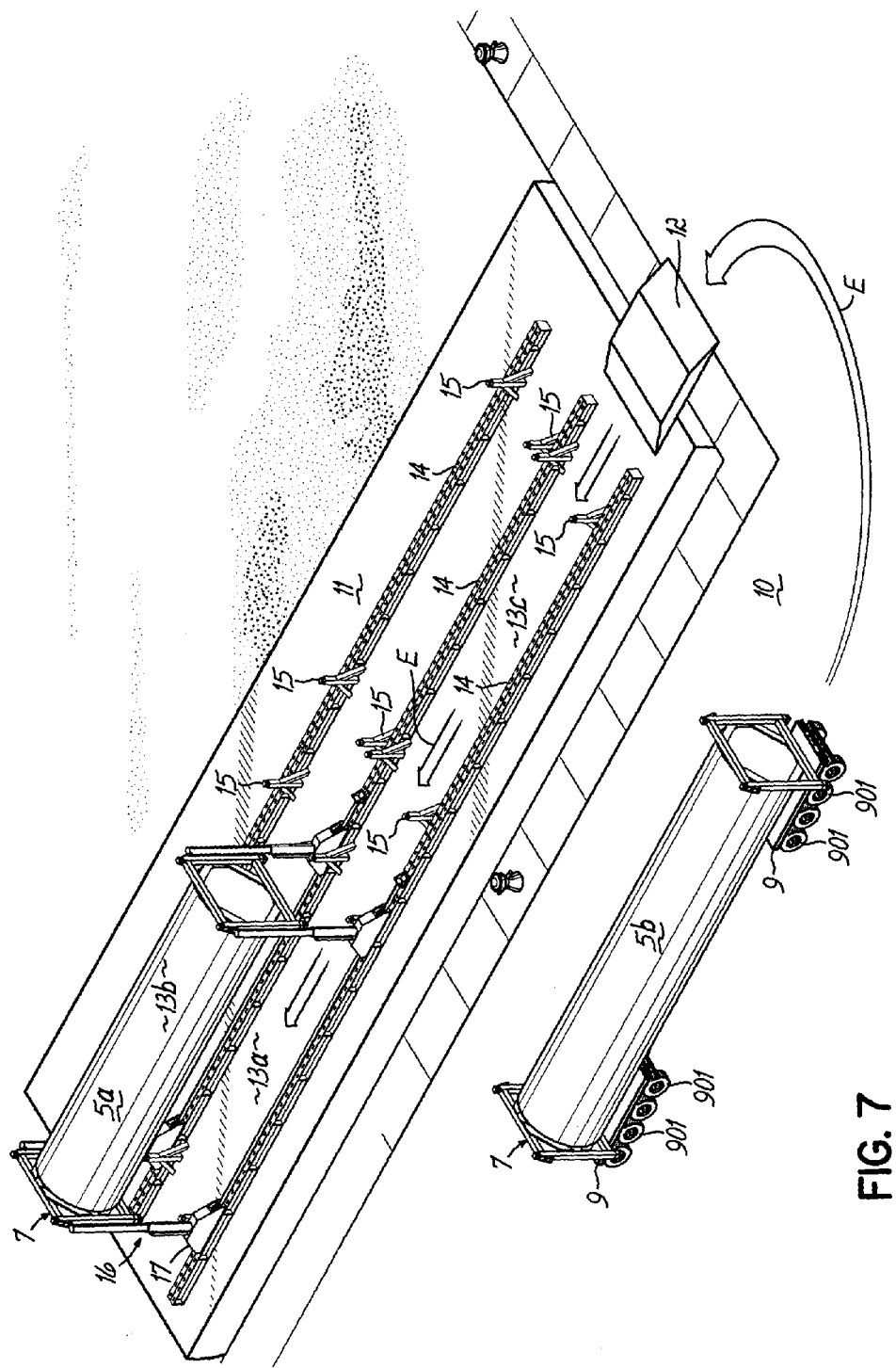
FIG. 7 is a perspective view of both tower sections in FIG. 2, and the sea vessel in FIG. 3.

Reference is made to FIG. 7. In a manner similar to what has been described above, the second tower section 5b is arranged to be supported by a plurality of wheels 901 of SPMTs 9, and rolled to the quay 10, onto the vessel 11, and into the first location 13a, as indicated by the arrow E. Thereby, the second tower section 5b is inserted under the first tower section 5a, which is held in the second location 13b by the jacks 16.

Figure 8:
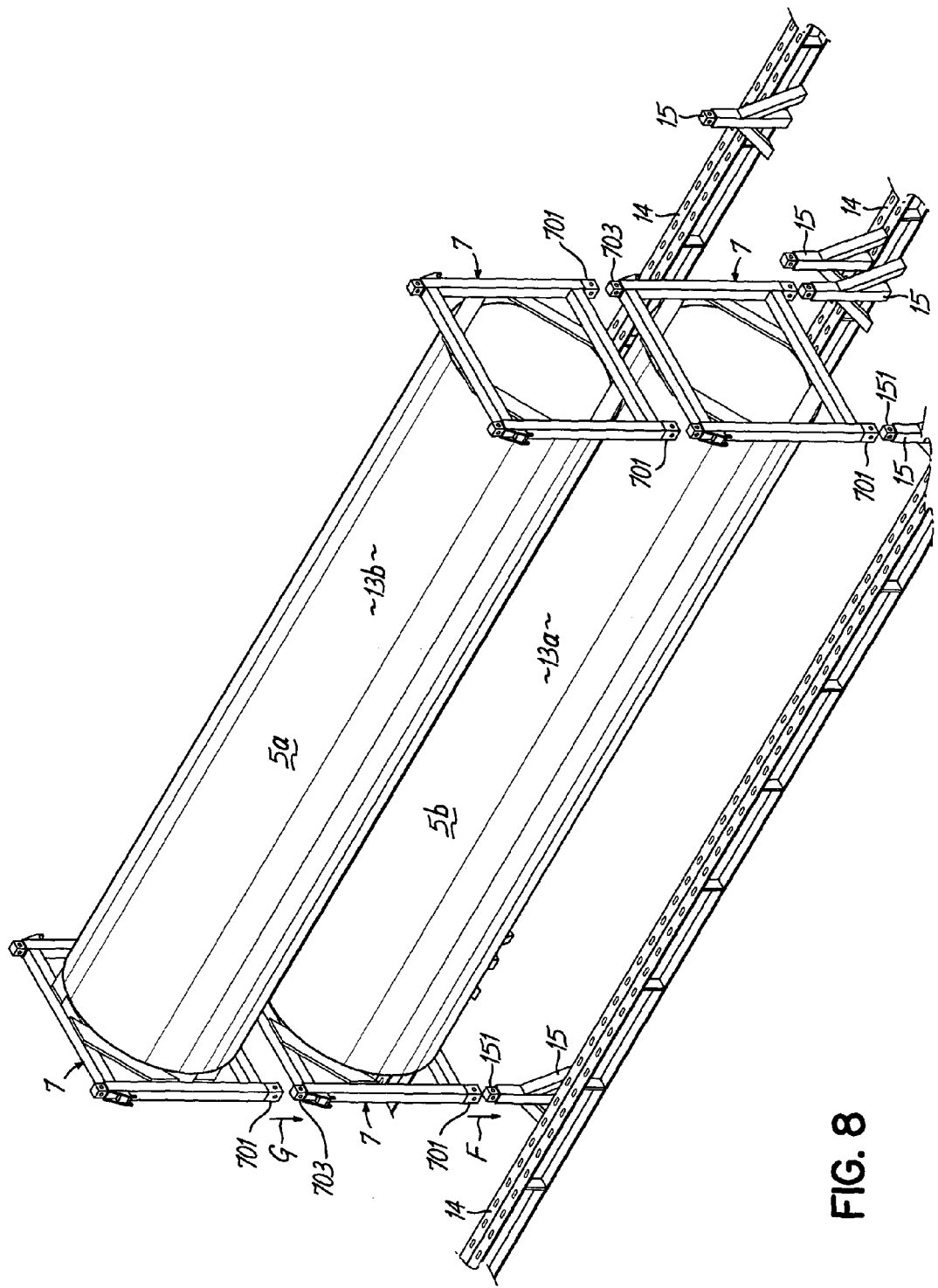
FIG. 8 is a perspective view of the tower sections in FIG. 7 on board the vessel in FIG. 3, FIG. 9*a* and FIG. 9*b* show side views of alternative jacks to be used in embodiments of the method according to the invention.

Reference is made to FIG. 8. In the first location 13a, the second tower section 5b is positioned so that lower corners 701 of the frames 7 are aligned with the respective sea fastening legs 15. For engaging the frames 7 of the second tower section 5b to the sea fastening legs 15, the load platforms of the SPMTs (not shown in FIG. 8) are lowered, thereby lowering the second tower section 5b, as indicated by the arrow F, so that the upper ends 151 of the sea fastening legs 15 enter cavities of the respective lower corners 701 of the frames 7. The frames 7 of the second tower section 5b are secured to the sea fastening legs 15 by twistlock fittings, or other suitable connection devices.

Subsequently, by retracting the jacks 16 (not shown in FIG. 8), the first tower section 5a is lowered, as indicated by the arrow G, onto the second tower section 5b. More specifically, by retracting the jacks 16, the frames 7 mounted to the first tower section 5a are lowered onto the frames 7 mounted to the second tower section 5b. The frames 7 are connected by twistlock connections at the lower corners 701 of the frames 7 mounted to the first tower section 5a, and upper corners 703 of the frames 7 mounted to the second tower section 5b. Thereby, the first and second tower sections 5a, 5b are safely stored on the vessel deck without the use of any crane.

The arrangement for extending and retracting the telescopic legs 161 of the jacks can be provided in a number of alternative ways. For example, the telescopic legs 161 could be provided with a hydraulic cylinder and piston arrangement. FIG. 9a and FIG. 9b show two alternatives with wire operated telescopic legs 161. In FIG. 9a, a wire 164 extends from the lower end of an inner tube 163 of the leg 161, around a pulley 165 mounted on the upper end of an outer tube 166 of the leg 161, and to a motorised winch 167 in the skid shoe 17. Reeling in the wire 164 with the winch 167 will cause the inner tube to move out of the outer tube so as for the telescopic leg 161 to be extended. In FIG. 9b, the motorised winch is replaced with a hydraulic cylinder 168 arranged on the exterior of the leg 161. The wire 164 is in FIG. 9b extended around the two ends of the hydraulic cylinder 168 in such a way the an extension of the hydraulic cylinder 168 will cause the inner tube to move out of the outer tube so as for the telescopic leg 161 to be extended.

When the first tower section 5a has been lowered onto the second tower section 5b, the jacks 16 are moved along the skid beams 14 to be used for stacking two further tower sections at a further location 13c, indicated in FIG. 7. Means for this movement of the jacks 16 is shown in FIG. 6. The two skid shoes 17 on each skid beam 14 are connected with a wire 173, and on the other side of one of the two skid shoes 17 on one of the skid beams 14, the anchor 172 is provided fixed to the skid beam 14. The wire 171 connects the anchor 172 and the skid shoe 17 closest to the anchor 172. The skid shoes 17 comprise motorised winches adapted to reel the wires 171, 173 in and out. Thereby, by suitable actuation of the motorised winches, the skid shoes 17 with the jacks can be moved to desired positions along the skid beams 14. For flexibility of the system, the anchors 172 can be moved and mounted on in a large amount of alternative positions along the skid beams 14.

As can be seen in FIG. 7, the vessel 11 comprises a further skid beam 14, thus presenting three parallel skid beams 14. As can be seen in FIG. 10a-FIG. 10d, the trunnion 162 on top on each jack 16 can be swung around a vertical axis, as indicated by the arrow H in FIG. 10c. This provides for jacks 16 on the middle skid beam 14 to serve tower section stacking operations on both sides of the middle skid beam 14.

It is understood that for unloading the tower sections 5a, 5b from the vessel, essentially the steps described above are carried out in a reverse order. Thus, the jacks 16 are placed so are to at the frames 7, and extended so as to engage the lugs 702 of the frames 7 mounted to the first tower section 5a. The first tower section 5a is raised and thereby released from the second tower section 5b. SPMTs 9 are placed under the frames 7 of the second tower section 5b, and the load platforms 902 of the SPMTs are raised so as to raise the second tower section 5b and release it from the sea fastening legs 15. The second tower section 5b is then moved away from the first location 13a and rolled off the vessel 11. The jacks 16 are retracted to lower the first tower section 5a from the second location 13b into the first location 13a, so as for the frames 7 mounted to it to engage the sea fastening legs 15. SPMTs are placed under the frames 7 on the first tower section 5a, and the load platforms 902 of the SPMTs are raised to release the first tower section 16 from the sea fastening legs 15. Then the first tower section 5a is rolled away from the first location 13a and off the vessel 11.

Figure 11:
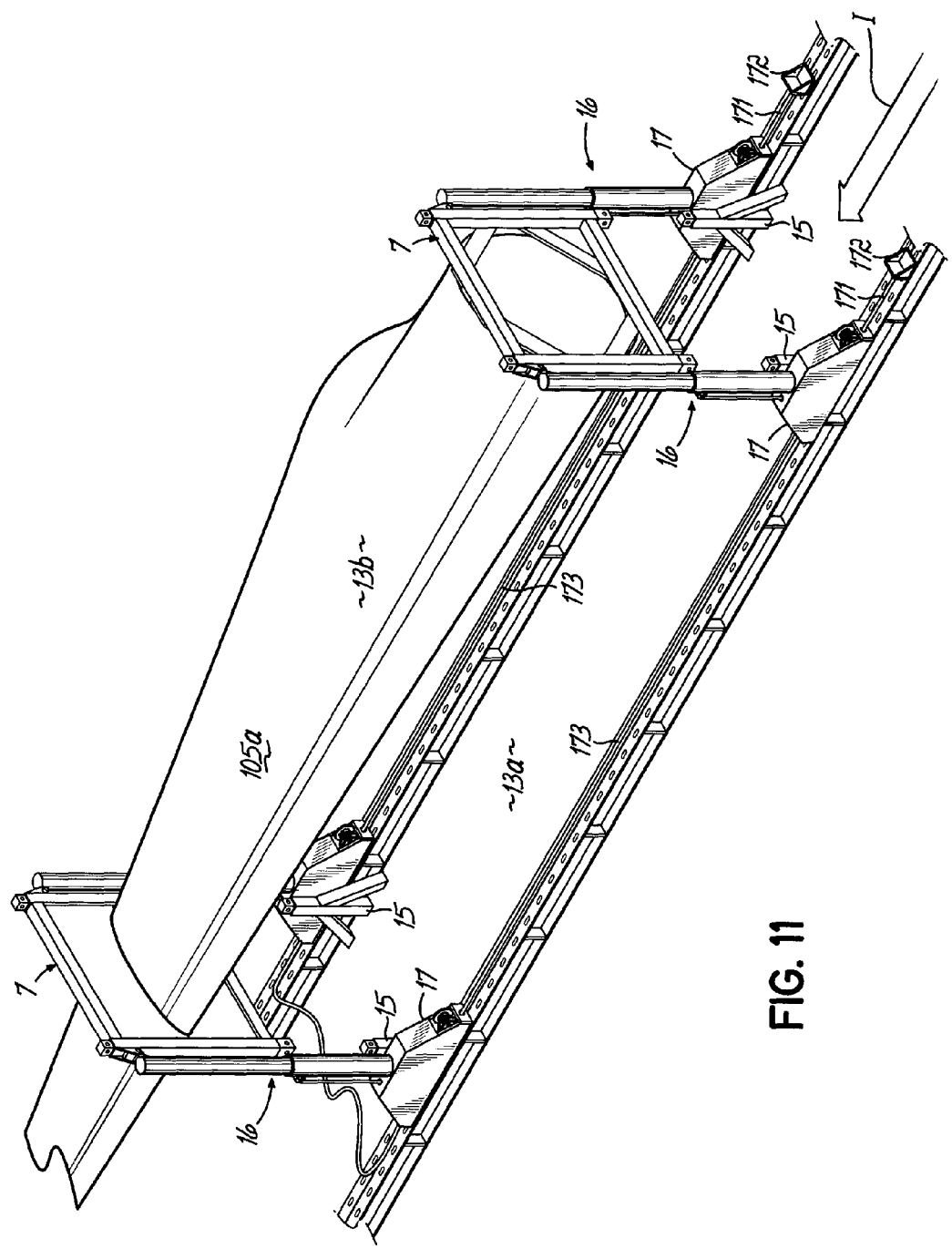
FIG. 11 shows a wind turbine blade raised with jacks.

FIG. 11 suggests how the invention can be used for objects in the form of wind turbine blades. A first blade 105 is provided with frames 7 used to support the first blade on SPMTs (not shown) as has been described above. The first blade 5a is rolled into a first position 13a, in which the frames 7 are engaged by jacks 16, similarly to what has been described above. The jacks 16 are used to raise the first blade 5a to a second position 13b. Thereafter, a second blade (not shown) is rolled into the first position 13a, as indicated by the arrow I. The first blade 5a is lowered onto the second blade. Thereafter, for a stack of three blades for a three blades wind turbine, the jacks 16 are used to raise the first and second blades, and a third blade (not shown) is rolled into the first position 13a. The frames on the third blade are fixed to sea fastening legs (not shown), similarly as described above, and the first and second blades are lowered onto the third blade.

Figure 12:
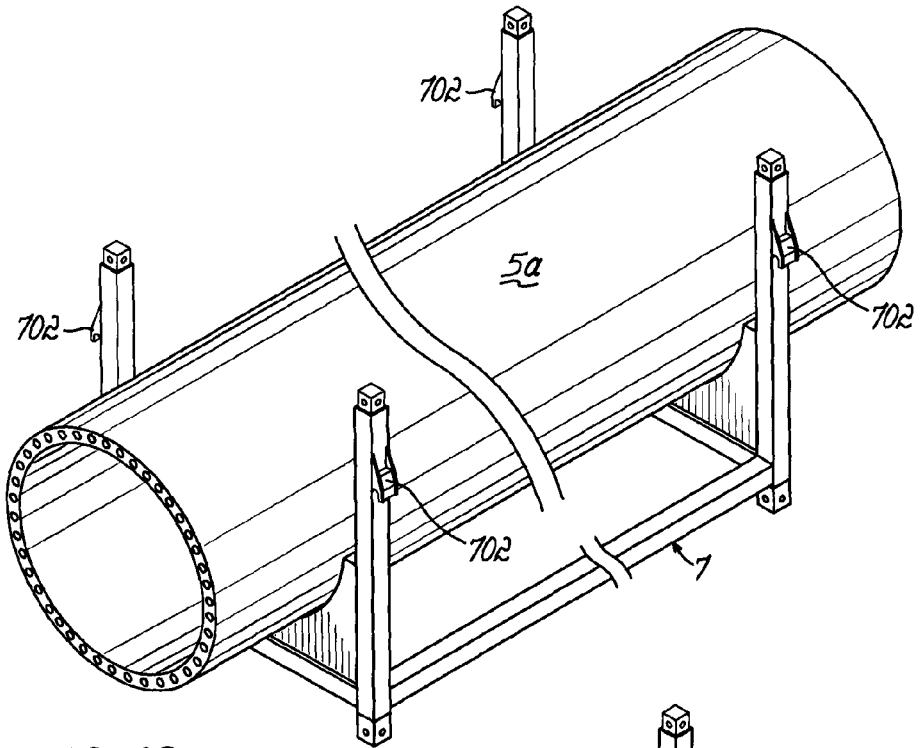
FIG. 12 and FIG. 13 show perspective views of tower sections with respective alternatives to the frames shown in FIG. 2.

It should be noted that the handling interface device 7 can, instead of a frame 7, be provided in a number of alternative forms. For example, as depicted in FIG. 12, for each object 5a, in this case a tower section 5a, a handling interface device 7 can be provided in the form of a cradle 7 supporting the object. Such a cradle could be adapted to extend around the centre of gravity of the object, and it could present all engagement elements, e.g. lugs 702 as described above, needed for engagement of a number of jacks to raise the object from the first to the second position. In other embodiments, for each object, a number of handling interface devices can be provided, each in the form of a bracket presenting a single engagement element for engagement of a respective jack. In further embodiments, handling interface devices as disclosed in WO2007093854A2 can be used.

Figure 13:
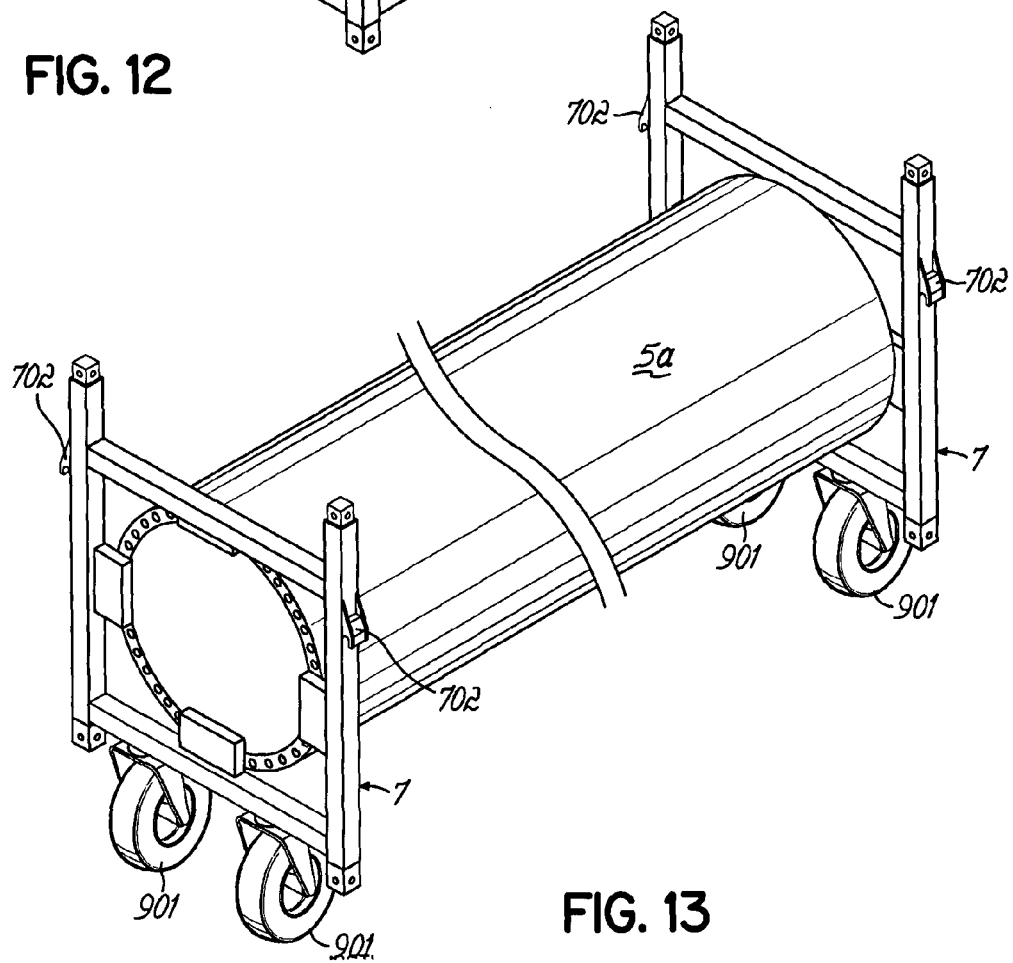

It should also be noted that the arrangement of the objects to be supported by a plurality of wheels can be embodied in a number of alternative ways. For example, instead of used SPMTs as described above, the handling interface devices 7 can be provided with wheels. For example, as depicted in FIG. 13, for each object, in this case a tower section 5a, frames 7 are provided with wheels 901. Alternatively, the handling interface device(s) 7 can be provided as a cradle with wheels, or brackets with wheels. Wheels fitted to the handling interface devices can be permanently mounted on said devices.

It should be noted that as an alternative to moving the second object into the first location, thereby inserting the second object under the first object, the first object can be moved along the skid beams, while supported by the jack up devices, from the second location into a third location above the second object.

The invention claimed is:
1. A method for storing and/or transporting a plurality of wind turbine components for one or more wind turbines, the method comprising:
  mounting at least one handling interface device to each of a first of the wind turbine components and a second of the wind turbine components, wherein the at least one handling interface device mounted onto the first wind turbine component presents a plurality of engagement elements,
  arranging the first wind turbine component to be supported by a plurality of wheels,
  arranging the second wind turbine component to be supported by a plurality of wheels,
  rolling the first wind turbine component into a first location,
  engaging a raising arrangement to the engagement elements,
  subsequently raising the first wind turbine component to a second location above the first location using the raising arrangement, and subsequently rolling the second wind turbine component into the first location, thereby inserting the second wind turbine component under the first wind turbine component.

2. The method according to claim 1, further comprising, after rolling the second wind turbine component into the first location, lowering the first wind turbine component so as to be supported by the second wind turbine component or the one or more handling interface mounted to the second wind turbine component.

3. The method according to claim 1, wherein the first location is on a vehicle or a vessel and the first and second wind turbine components are rolled onto the vehicle or the vessel before being rolled into the first location.

4. The method according to claim 1, wherein, after rolling the second wind turbine component into the first location, lowering the first wind turbine component so as to be supported by the one or more handling interface devices mounted to the second wind turbine component, and the handling interface devices are used to fix the first and second wind turbine components to each other after the step of lowering the first wind turbine component onto the second wind turbine component.

5. The method according to claim 1, wherein the first and second wind turbine components are elongated wind turbine components, and the method comprises mounting to each of the first and second wind turbine components at least two handling interface devices, each handling interface device mounted to the first wind turbine component comprising the plurality of engagement elements, the method further comprising engaging to each of the engagement elements a respective jack up device, the step of raising the first wind turbine component to the second location being carried out by using the jack up devices.

6. The method according to claim 5, wherein each of the jack up devices presents an engagement device for engaging a respective one of the engagement elements, at least one of the engagement devices being adapted to be rotated around a vertical axis.

7. The method according to claim 1, comprising:
arranging a third wind turbine component to be supported by a plurality of wheels,
fixing the first and second wind turbine components to each other after lowering the first wind turbine component onto the second wind turbine component,
subsequently raising the first and second wind turbine components to the second location above the first location,
subsequently rolling the third wind turbine component into the first location, thereby inserting the third wind turbine component under the second wind turbine component, and
subsequently lowering the first and second wind turbine components onto the third wind turbine component.

8. A method for storing and/or transporting a plurality of objects, the method comprising:
mounting at least one handling interface device to each of a first object and a second object, wherein the at least one handling interface device mounted onto the first object presents a plurality of engagement elements,
arranging the first object to be supported by a plurality of wheels, and
arranging the second object to be supported by a plurality of wheels,
rolling the first object into a first location,
engaging a raising arrangement to the engagement elements,
subsequently raising the first object to a second location above the first location using the raising arrangement, and
subsequently rolling the second object into the first location, thereby inserting the second object under the first object,
wherein, after rolling the second object into the first location, lowering the first object so as to be supported by the one or more handling interface devices mounted to the second object, and the handling interface devices are used to fix the first and second objects to each other after the step of lowering the first object onto the second object.

9. The method according to claim 8, wherein the first location is on a vehicle or a vessel and the first and second objects are rolled onto the vehicle or the vessel before being rolled into the first location.

10. The method according to claim 8, wherein the first and second objects are elongated objects, and the method comprises mounting to each of the first and second objects at least two handling interface devices, each handling interface device mounted to the first object comprising the plurality of engagement elements, the method further comprising engaging to each of the engagement elements a respective jack up device, the step of raising the first object to the second location being carried out by using the jack up devices.

11. The method according to claim 10, wherein each of the jack up devices presents an engagement device for engaging a respective one of the engagement elements, at least one of the engagement devices being adapted to be rotated around a vertical axis.

12. The method according to claim 8, comprising:
arranging a third object to be supported by a plurality of wheels,
fixing the first and second objects to each other after lowering the first object onto the second object,
subsequently raising the first and second objects to the second location above the first location,
subsequently rolling the third object into the first location, thereby inserting the third object under the second object, and
subsequently lowering the first and second objects onto the third object.

13. The method according to claim 1, wherein the raising arrangement includes jack-up devices.

14. The method according to claim 13, wherein the raising arrangement includes four jack-up devices.

15. The method according to claim 1, wherein engagement elements are provided in the form of lugs.

16. The method according to claim 1, wherein at least one of the wind turbine components is an elongate wind turbine component.

17. The method according to claim 16, wherein the elongate wind turbine component is a wind turbine tower section or a wind turbine blade.

18. The method according to claim 1, wherein the handling device is a frame or a cradle.

19. The method according to claim 1, wherein the steps of arranging the first and second wind turbine components to be supported by the plurality of wheels further includes placing the first and second wind turbine components onto respective multi-axle trailers or self-propelled modular trailers.

20. The method according to claim 1, wherein the steps of arranging the respective first and second wind turbine components to be supported by the plurality of wheels further includes mounting the one or more handling interface devices with wheels onto the first or second wind turbine components.

\* \* \* \* \*